UNITED STATES PATENT OFFICE.

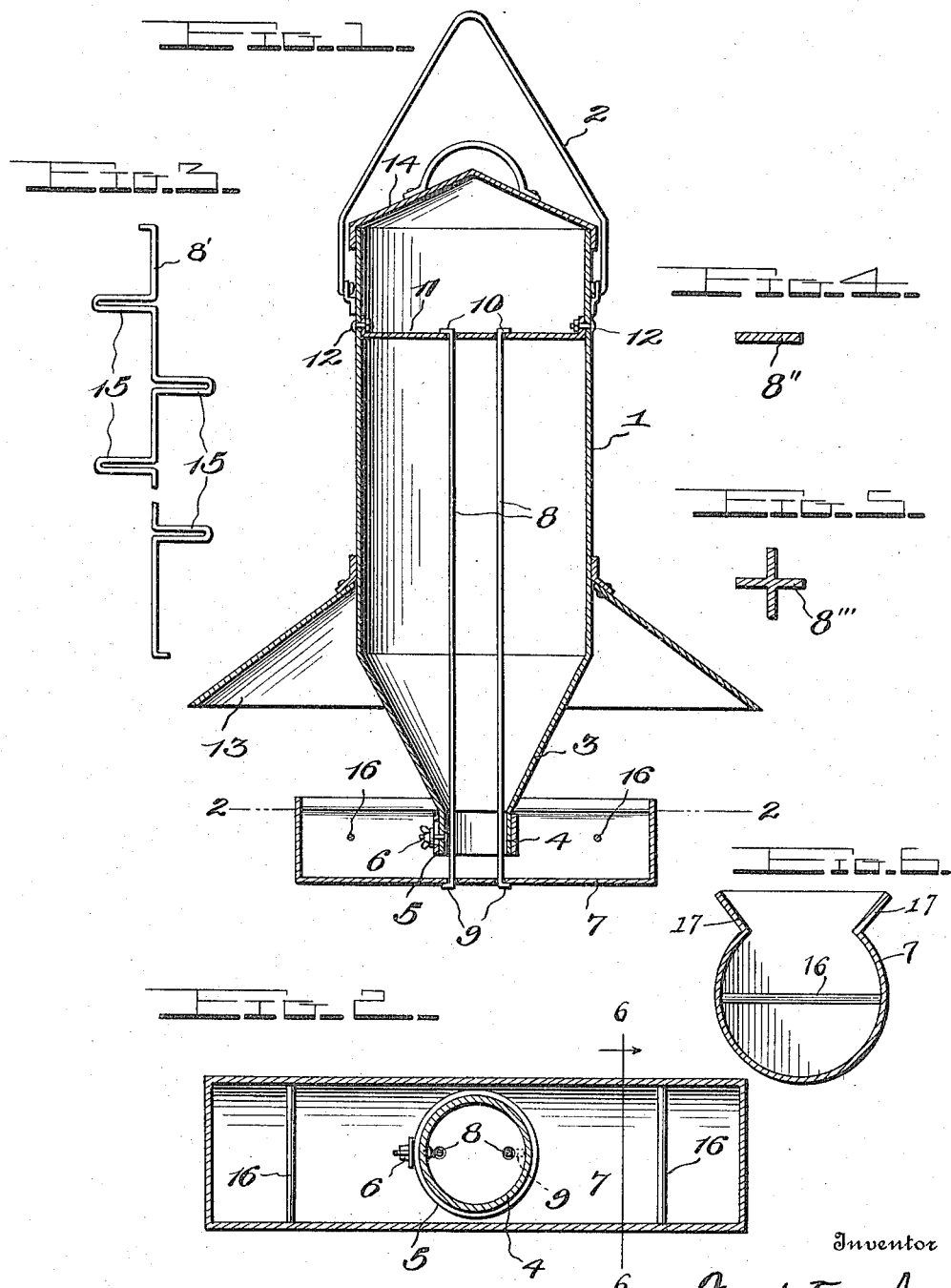

FRANK ENOS, JR., OF NORWICH, CONNECTICUT, ASSIGNOR TO THE NORWICH AUTOMATIC FEEDER COMPANY, OF NORWICH, CONNECTICUT, A CORPORATION OF CONNECTICUT.

POULTRY-FEEDER.

1,148,301.  Specification of Letters Patent.  Patented July 27, 1915.

Application filed August 12, 1914. Serial No. 856,464.

*To all whom it may concern:*

Be it known that I, FRANK ENOS, Jr., a citizen of the United States, residing at Norwich, county of New London, State of Connecticut, have invented certain new and useful Improvements in Poultry-Feeders; and I do declare the following to be a full, clear, and exact description of the invention, such as will enable others skilled in the art to which it appertains to make and use the same.

This invention relates to certain new and useful improvements in dry mash feeders for poultry, and the primary object thereof is to provide improved means for effecting agitation of the dry mash so as to prevent packing thereof in the hopper, and consequent cessation in the feed of the dry mash into the trough.

Dry mash has the property of packing to an extent which precludes free feeding thereof, and unless maintained thoroughly agitated, the feeding will cease or be so slow as to be impracticable for the purpose intended, the present invention aiming to produce constant and effective agitation of the dry mash so as to insure free feeding thereof to the trough.

The invention further aims to provide a trough which by its movements maintains automatic agitation of the dry mash through the suspending means of the trough, and to so mount the trough that same has practically universal movement, that is to say, up and down, and side-wise in the plane of an arc.

Further the other objects of the invention will later appear and be manifested in the course of the following description.

In the drawings: Figure 1 is a central vertical sectional view of the invention; Fig. 2 is an enlarged section taken on the line 2—2 of Fig. 1; Fig. 3 is a side elevation of a modified form of supporting rods for the trough; Figs. 4 and 5, are transverse sectional views of still further modified forms of supporting rods; and Fig. 6 is an enlarged section on the line 6—6 of Fig. 2.

The hopper 1 in which the dry mash is placed, is supported by a bail 2, which latter may be suspended by a chain, or cord, so as to be freely movable in all directions. The lower end of the hopper is contracted at 3 and formed at its lowermost portion with a discharge mouth 4 which latter is surrounded by a collar 5, that is adjustable lengthwise of the mouth by a slot and thumb screw connection 6, whereby the distance between the extremity of the mouth and the bottom of the trough 7 may be regulated to provide for desired regulation of the discharge of the dry mash from the mouth. The trough 7 is suspended so as to be vertically movable and tiltable at the ends of the trough, and so as to be also capable of being horizontally oscillated, the means for mounting consisting of a pair of rods 8 arranged in spaced relation and having right angular lower ends 9 and similar upper ends 10, the lower ends projecting loosely through openings provided for their reception in the bottom of trough 7, and the upper ends 10, being loosely projected through openings provided therefor in a supporting stirrup 11, which latter is extended transversely across the hopper at the upper end of the latter and is secured to the hopper by bolts 12 or the like. It will be noted that the rods 8 are arranged in parallelism and extend completely through the discharge mouth 4 so as to contact with the walls which define said mouth during movement of the trough. The trough 7 has its side walls spaced from the walls which define the mouth 4, so as to allow the trough to freely move toward and away from the mouth. A water shed 13 of truncated cone formation is secured to the hopper and overlies the trough so as to prevent rain from entering the trough. A removable top 14 provides means whereby the hopper may be filled, and also acts to prevent rain from entering the hopper.

In Fig. 3 of the drawings a modified form of supporting and agitating rod 8' is shown, in which the rod is provided with bends which provide lateral agitating fingers 16; or as shown in Fig. 4, rods 8'' may be employed which have a rectangular cross-sectional configuration. A still further modified form of rods 8''' is shown in Fig. 5, in which same have a cruciform cross-sectional configuration.

The rods 8 are very flexible and fit loosely within the bottom of the trough 7 so that vertical relative movements of the rods and trough are possible. It will therefore be apparent that the poultry, in pecking at the mash within the trough, will maintain the latter in a constant state of agitation in all directions, and consequently the rods 8 will be twisted, contorted, swayed and bowed, owing to the fact that these rods are very flexible, the result being that the mash within the hopper will be thoroughly agitated and fed into the trough.

The loose connections between the rods 8 and the stirrup 11 and trough 7, and the extreme flexibility of the rods themselves, are mainly responsible for the ready vibration, twisting, bowing and distortion of the rods, but it will be clear that such distortion or other abnormal flexures of these rods are merely temporary and not at all permanent. In addition these rods can be swayed bodily back and forth and in different directions, all of which aforementioned movements of the parts combine to provide a very effective means of agitation of the mash, in addition to a means of support for the trough. Cross wires 16 are extended across the trough so as to prevent the poultry from throwing the mash out of the ends of the trough, for which latter purpose the trough sides are also flared at 17.

What is claimed is:

1. In a poultry dry mash feeder, a hopper having a contracted discharge mouth at its lower end, a trough at the lower end of the hopper into which the discharge mouth extends, and spaced flexible members loosely connected at their lower ends to the trough and at their upper ends to the hopper adjacent the upper end of the latter, said rods extending completely through the discharge mouth, whereby the trough may bump against the discharge mouth and may be agitated in all directions with relation to the hopper so as to temporarily agitate and distort the rods.

2. In combination with a hopper having a support therein and having a discharge mouth, a trough into which the discharge mouth extends, and flexible spaced wires movably connected at their ends to said support and the trough, said wires extending completely though the discharge mouth.

In testimony whereof I affix my signature in presence of two witnesses.

FRANK ENOS, Jr.

Witnesses:
E. J. CAMPBELL,
H. H. THACKER.

Copies of this patent may be obtained for five cents each, by addressing the "Commissioner of Patents, Washington, D. C."